(12) United States Patent
Borland et al.

(10) Patent No.: US 9,200,904 B2
(45) Date of Patent: Dec. 1, 2015

(54) TRAFFIC ANALYSIS SYSTEM UTILIZING POSITION BASED AWARENESS

(71) Applicant: CATERPILLAR INC., Peoria, IL (US)

(72) Inventors: Brad Kenneth Borland, Peoria, IL (US); Paul Russell Friend, Morton, IL (US); Mathew Chacko, Dunlap, IL (US)

(73) Assignee: Caterpillar, Peoria, IL (US)

(*) Notice: Subject to any disclaimer, the term of this patent is extended or adjusted under 35 U.S.C. 154(b) by 125 days.

(21) Appl. No.: 13/837,905

(22) Filed: Mar. 15, 2013

(65) Prior Publication Data

US 2014/0278043 A1  Sep. 18, 2014

(51) Int. Cl.
| | |
|---|---|
| *G01C 21/00* | (2006.01) |
| *G08G 1/00* | (2006.01) |
| *B60W 30/08* | (2012.01) |
| *G05D 1/02* | (2006.01) |

(52) U.S. Cl.
CPC ............... *G01C 21/00* (2013.01); *B60W 30/08* (2013.01); *G05D 1/02* (2013.01); *G08G 1/22* (2013.01)

(58) Field of Classification Search
CPC ......... G08G 1/22; G01C 21/00; G60W 30/08; G05D 1/02
See application file for complete search history.

(56) References Cited

U.S. PATENT DOCUMENTS

| | | | |
|---|---|---|---|
| 5,612,686 | A | 3/1997 | Takano et al. |
| 6,038,502 | A | 3/2000 | Sudo |
| 6,225,918 | B1 | 5/2001 | Kam |
| 7,102,496 | B1 | 9/2006 | Ernst, Jr. et al. |
| 7,656,311 | B2 | 2/2010 | Holmes et al. |
| 2011/0246071 | A1* | 10/2011 | Tsunekawa ................... 701/301 |
| 2012/0127017 | A1 | 5/2012 | Sasabuchi |

* cited by examiner

*Primary Examiner* — John Q Nguyen
*Assistant Examiner* — Michael Kerrigan
(74) *Attorney, Agent, or Firm* — Finnegan, Henderson, Farabow, Garrett & Dunner, LLP

(57) ABSTRACT

A system and method of analyzing traffic in a vicinity of a first machine is disclosed. The method may include determining, by one or more computer processors, a projected position of the first machine based on a yaw rate and velocity of the first machine. The method may further include determining, by the one or more computer processors, a predicted zone in the vicinity of the first machine based on the projected position of the first machine. The method may further include determining whether a second machine is present in the predicted zone. In response to determining that the second machine is present in the predicted zone, the method may further include determining whether an unsafe condition exists between the first machine and the second machine.

17 Claims, 8 Drawing Sheets

TRAFFIC ANALYSIS SYSTEM UTILIZING POSITION BASED AWARENESS

TECHNICAL FIELD

The present disclosure relates generally to a machine and, more particularly, to a machine having a traffic analysis system utilizing position based awareness.

BACKGROUND

Machines such as, for example, dozers, motor graders, wheel loaders, wheel tractor scrapers, and other types of heavy equipment are used to perform a variety of tasks. Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. On minesites or other worksites, a plurality of such machines may be operated either autonomously or by vehicle operators physically present inside the machines. To increase safety on such minesites, operators of these machines need to be aware of the behavior of other machines operating around them. For example, operators of these machines need to be aware of whether or not their machine is following or is being followed by another machine and whether a safe distance exists between their machine and other machines.

An exemplary system that may be used to monitor a distance between two vehicles is disclosed in U.S. Pat. No. 5,612,686 ("the '686 patent") to Takano et al. that issued on Mar. 18, 1997. The system of the '686 patent sets predefined areas in front of a vehicle and detects whether another vehicle enters those predefined areas. If another vehicle enters the predefined areas, the system of the '686 patent initiates an alarm urging the operator to initiate a braking operation.

Although the system of the '686 patent may be useful in warning machine operators of the presence of other machines in their vicinity, the '686 patent system may not be ideal for worksites such as minesites where many machines operate simultaneously on tracks that may not be well defined. For example, the system of the '686 patent may sound an alarm to the operator as soon as another machine enters a predefined area in front of the operator's machine. Such a warning may not be required and in fact may be a nuisance because the other machine may soon leave the vicinity of the operator's machine and hence, there may not be a real collision threat. Further, the system of the '686 patent may not take into account future predicted positions of the machine in setting the predefined areas.

The traffic analysis system of the present disclosure is directed toward solving one or more of the problems set forth above and/or other problems of the prior art.

SUMMARY

In one aspect, the present disclosure is directed to a system for analyzing traffic in a vicinity of a first machine. The system may include a locating device configured to receive a signal indicative of a location of the first machine, and a controller in communication with the locating device. The controller may be configured to determine a velocity of the first machine using the received signal, and determine a projected position of the first machine based on the velocity and a yaw rate of the first machine. The controller may be further configured to determine a predicted zone in the vicinity of the first machine based on the projected position of the first machine and determine whether a second machine is present in the predicted zone. In response to determining that the second machine is present in the predicted zone, the controller may be further configured to determine whether an unsafe condition exists between the first machine and the second machine.

In another aspect, the present disclosure is directed to a method of analyzing traffic in a vicinity of a first machine. The method may include determining, by one or more computer processors, a projected position of the first machine based on a yaw rate and velocity of the first machine. The method may further include determining, by the one or more computer processors, a predicted zone in the vicinity of the first machine based on the projected position of the first machine. The method may further include determining whether a second machine is present in the predicted zone. In response to determining that the second machine is present in the predicted zone, the method may further include determining whether an unsafe condition exists between the first machine and the second machine.

In yet another aspect, the present disclosure is directed to a non-transitory computer-readable storage device storing instruction for enabling a processor to execute a method of analyzing traffic in a vicinity of a first machine. The method may include determining a projected position of the first machine based on a yaw rate and velocity of the first machine. The method may further include determining a predicted zone in the vicinity of the first machine based on the projected position of the first machine. The method may further include determining whether a second machine is present in the predicted zone. In response to determining that the second machine is present in the predicted zone, the method may further include determining whether an unsafe condition exists between the first machine and the second machine.

DETAILED DESCRIPTION

Figure 1:
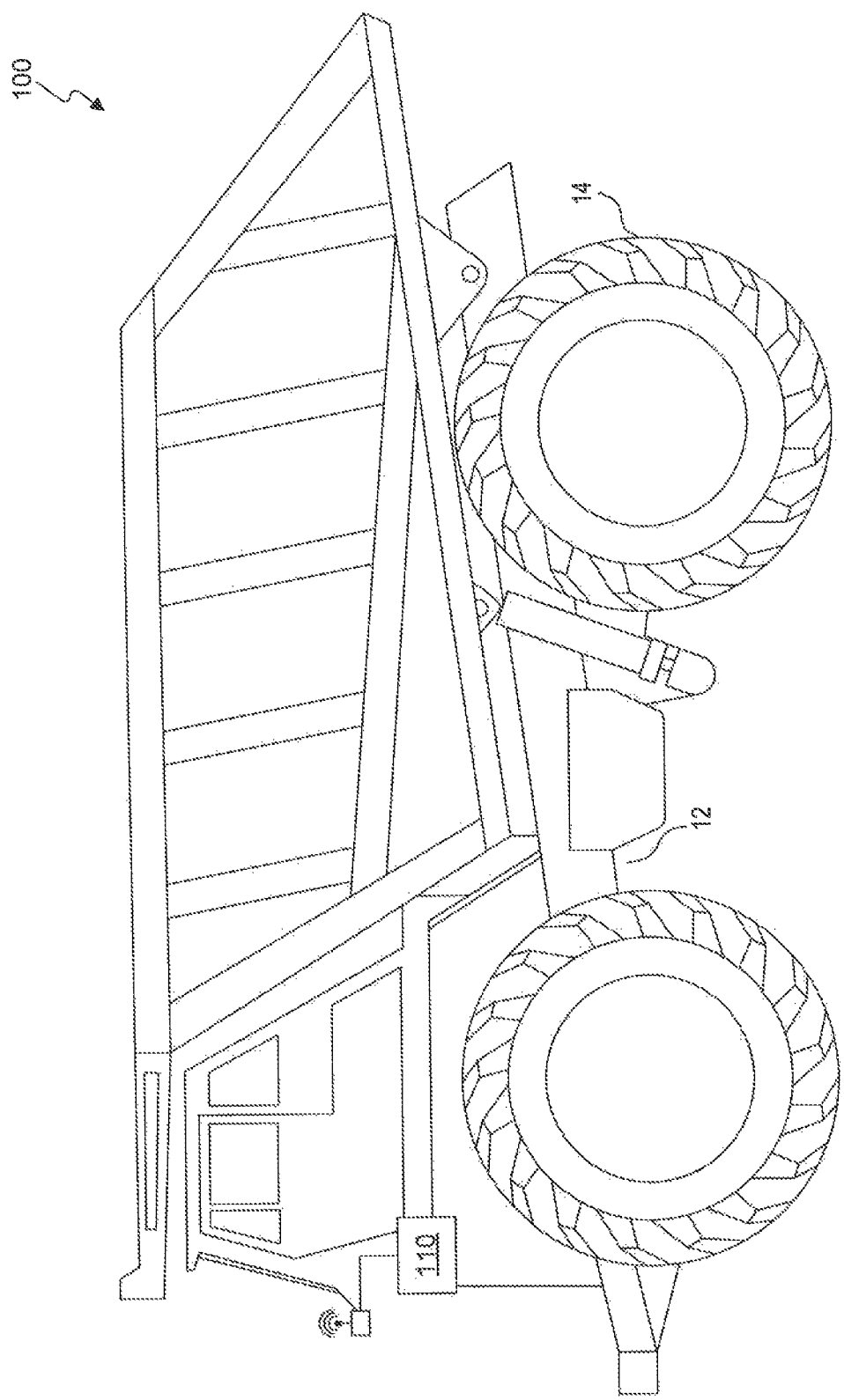
FIG. 1 is a pictorial illustration of an exemplary disclosed machine.

FIG. 1 illustrates a machine 100 having an exemplary disclosed traffic analysis system 110. The machine 100 may be configured to perform some type of operation associated with an industry such as mining, construction, farming, transportation, power generation, or any other industry known in the art. For example, machine 100 may be an earth moving machine such as a haul truck, a dozer, a loader, a backhoe, an excavator, a motor grader, a wheel tractor scraper or any other earth moving machine. Machine 100 may generally include a frame 12 that at least partially defines or supports an operator station, one or more engines mounted to the frame, a plurality of traction devices 14 driven by the engine to propel machine 100. The traction devices 14, in the disclosed exemplary embodiments, are wheels located at opposing sides of machine 100. Each traction device 14 may be independently driven to turn machine 100 or simultaneously and independently driven to propel machine 100 in a straight direction. It is contemplated that one or all of traction devices 14 may be replaced with another type of traction device, if desired, such as belts or tracks.

Figure 2A:
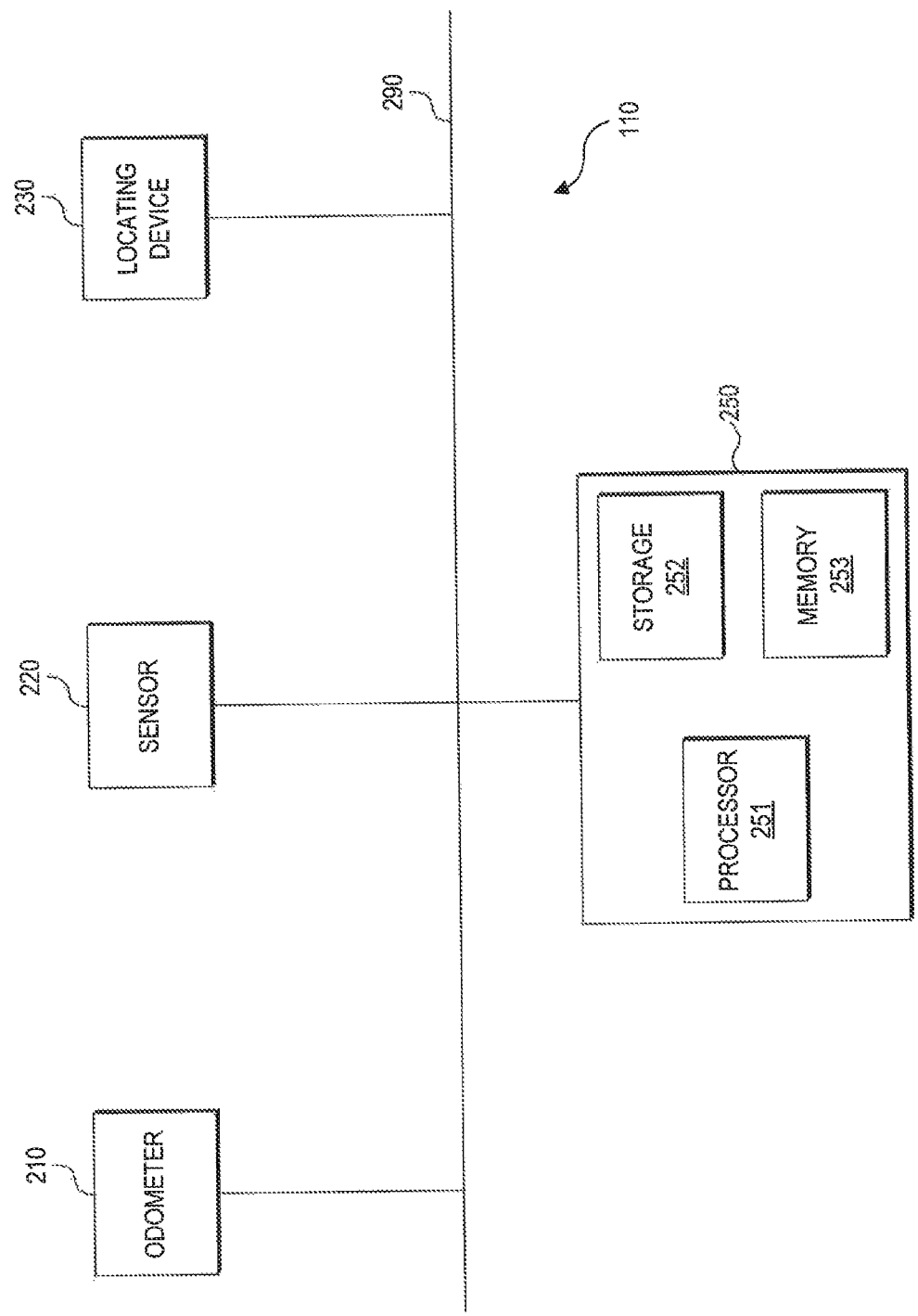
FIG. 2A is a diagrammatic illustration of an exemplary disclosed traffic analysis system that may be used in conjunction with the machine of FIG. 1.

FIG. 2A illustrates an exemplary embodiment of the traffic analysis system 110. The traffic analysis system 110 may include an odometer 210, a sensor 220, a locating device 230, and a controller 250. The above devices and controller 250 may be connected to each other via a bus 290. While a bus architecture is shown in FIG. 2A, any suitable architecture may be used, including any combination of wired and/or wireless networks. Additionally, such networks may be integrated into any local area network, wide area network, and/or the Internet.

Odometer 210 may provide a signal indicative of a distance traveled by machine 100. Odometer 210 may provide as the signal, a measurement of number of rotations of the traction device 14 (such as a wheel 14). Odometer 210 may also provide, as the signal indicative of a distance traveled by the machine, a measurement of number of rotations of a member of the machine 100's drive train. For example, odometer 210 may provide a measurement of number of rotations of an axle of machine 100.

Sensor 220 may include any device capable of providing angular rates of machine 100. For example, sensor 220 may include any device (such as a gyroscope) capable of measuring a yaw rate of the machine 100, and producing a corresponding yaw rate signal. Sensor 220 may also include a device (such as a gyroscope) capable of measuring a pitch rate of machine 100, and producing a corresponding pitch rate signal. Sensor 220 may further include a device (such as a gyroscope) capable of measuring a roll rate of machine 100, and producing a corresponding roll rate signal. Exemplarily, sensor 220 may include a single IMU including 3-axis angular rate gyros that provide signals indicative of the pitch rate, yaw rate, and roll rate of machine 100.

Locating device 230 may include any device capable of providing a signal that indicates machine 100's location. For example, locating device 230 could embody, a global satellite system device (e.g., a Global Positioning System (GPS) or Global Navigation Satellite System (GNSS) device), a laser range finding device, or any other known locating device that receives or determines positional information associated with machine 100 and can provide an independent measurement of the machine's position. Locating device 230 may be configured to convey a signal indicative of the received or determined positional information to one or more of interface devices for display of machine location, if desired. The signal may also be directed to a controller 250 for further processing. In the exemplary embodiments discussed herein, locating device 230 receives a GPS signal as the location signal indicative of the location of machine 100 and provides the received location signal to controller 250 for further processing. However, it will be understood by one of ordinary skill in the art that the disclosed exemplary embodiments could be modified to utilize other indicators of the location of machine 100, if desired.

Controller 250 may include processor 251, storage 252, and memory 253, included together in a single device and/or provided separately. Processor 251 may include one or more known processing devices, such as a microprocessor from the Pentium™ or Xeon™ family manufactured by Intel™, the Turion™ family manufactured by AMD™, any of various processors manufactured by Sun Microsystems, or any other type of processor. Memory 253 may include one or more storage devices configured to store information used by controller 250 to perform certain functions related to disclosed embodiments. Storage 252 may include a volatile or non-volatile, magnetic, semiconductor, tape, optical, removable, nonremovable, or other type of storage device or computer-readable medium. Storage 252 may store programs and/or other information, such as information related to processing data received from one or more sensors, as discussed in greater detail below.

In one embodiment, memory 253 may include one or more traffic analysis programs or subprograms loaded from storage 252 or elsewhere that, when executed by processor 251, perform various procedures, operations, or processes consistent with the disclosed embodiments. For example, memory 253 may include one or more programs that enable controller 250 to, among other things, collect data from one or more of odometer 210, sensor 220, and locating device 230, process the data according to disclosed embodiments such as those embodiments discussed with regard to FIGS. 2B-4B, and analyze traffic in the vicinity of machine 100 based on the processed data.

In certain exemplary embodiments, controller 250 (and more particularly, the processor 251) may begin executing a process of traffic analysis. Exemplarily, controller 250 may analyze traffic in front of machine 100 and behind machine 100. Traffic in front of machine 100 may be analyzed to ensure that machine 100 ("lead machine 100") maintains a safe distance when following another machine 100. Traffic behind machine 100 may be analyzed to ensure that lead machine 100 maintains a safe distance from another machine 100 that may be following lead machine 100. An example of such a traffic pattern can be seen in FIGS. 2C and 2D. In FIG. 2C, machine 1 (lead machine 100) may be following one or more of machines 2, 3, and 4 that are in front of machine 1. In FIG. 2D, machine 1 (lead machine 100) may be followed by one or more of machines 2, 3, and 4 that are behind machine 1. By analyzing traffic both in front and behind lead machine 100, operators of machines 1, 2, 3, and 4 may be alerted when a safe distance between lead machine 100 and any of machines 2, 3, and 4 is breached. While the above description relates to controller 250 of machine 1 as the lead machine 100, it will be understood that any of the other machines may be lead machines and each of their respective controllers may execute similar processes to determine safe distances between those machines and other machines. Using the traffic pattern of FIGS. 2C and 2D, traffic analysis by controller 250 of machine 1 or lead machine 100 will be explained next. At least initially, the description will focus on the traffic pattern of FIG. 2C in which lead machine 100 or machine 1 is following one or more of machines 2, 3, and 4 that are in front of machine 1.

To analyze traffic in front of lead machine 100, controller 250 may first determine which of machines 2, 3, and 4 lead machine 100 is following or will be following on its chosen route. To determine which machines lead machine 100 is following or will be following, controller 250 may determine a projected position of lead machine 100 after a predefined time. The predefined time may be set by an operator of lead machine 100 or by someone else to any value. For example, the predefined time may be set to 1 second, 2 seconds, 10 seconds, etc. based on the operator's preference. Once controller 250 determines the projected position of lead machine 100, controller 250 may determine a predicted zone based on the projected position and look for other machines in the predicted zone. Exemplary zones may be predefined. For example, in FIG. 2C, quadrants Q1, Q2, and Q3 may be zones that span 60 degrees each and may be predefined relative to the current heading of lead machine 100 (machine 1). The predicted zone for lead machine 100 may be the quadrant in which the projected position of lead machine 100 falls. For example, if the projected position of machine 1 falls in Q3, Q3 may be the predicted zone in which controller 250 looks for other machines. As shown in FIG. 2C, machine 4 is in Q3 and may be a machine that is being followed by lead machine 100 if the projected position of lead machine 100 falls in Q3. Once a machine (for example, machine 4) has been found to be in lead machine 100's predicted zone, controller 250 may determine whether machine 4 remains in lead machine 100's predicted zone for a certain period of time. It will be noted that the predicted zone for lead machine 100 may continuously change or update as lead machine 100 moves along its route. If machine 4 remains in lead machine 100's predicted zone for a certain period of time, lead machine 100 may be deemed to be following machine 4. At this time, controller 250 may begin to analyze whether an unsafe condition exists between lead machine 100 and machine 4. For example, controller 250 may determine whether a distance between lead machine 100 and machine 4 is less than a predefined unsafe following distance and alert the operators of lead machine 100 and machine 4 if such distance is breached. Next, a detailed description of the above traffic analysis is provided beginning with the calculation of the projected position and predicted zone.

The calculation of the projected position and predicted zone will be described with reference to FIGS. 2B-2D. To predict the position of lead machine 100 after a predefined time ("t"), controller 250 may first determine a heading of the lead machine 100. Heading is the angle lead machine 100 is pointed relative to North. The heading may be determined by controller 250 by integrating a yaw rate signal received from sensor 220. Alternatively, the heading may be calculated using GPS signals that may be received from locating device 230. For example, heading may be calculated using GPS signals using the following equation:

$$\text{Heading} = a\tan([E-E(z-1)]/[N-N(z^{-1})]) \quad (1)$$

Where N is Northing, E is Easting, and $z^{-1}$ is a unit delay. It should be noted that trigonometric functions typically provide the results in radians. In order to convert the result to degrees, the heading obtained from equation 1 may be multiplied by $180/\pi$.

Using the heading, controller 250 may determine the yaw rate of lead machine 100. In certain exemplary embodiments, the yaw rate may be directly available from sensor 220. In other exemplary embodiments, the yaw rate may be calculated using the heading obtained from equation 1. For example, the following equation may be used to calculate yaw rate:

$$\text{Yaw Rate} = (\text{Heading} - \text{Heading}(z^{-1}))/(\Delta t) \quad (2)$$

Where $z^{-1}$ is a unit delay and $\Delta t$ is the change in time between the two heading readings.

Figure 2B:
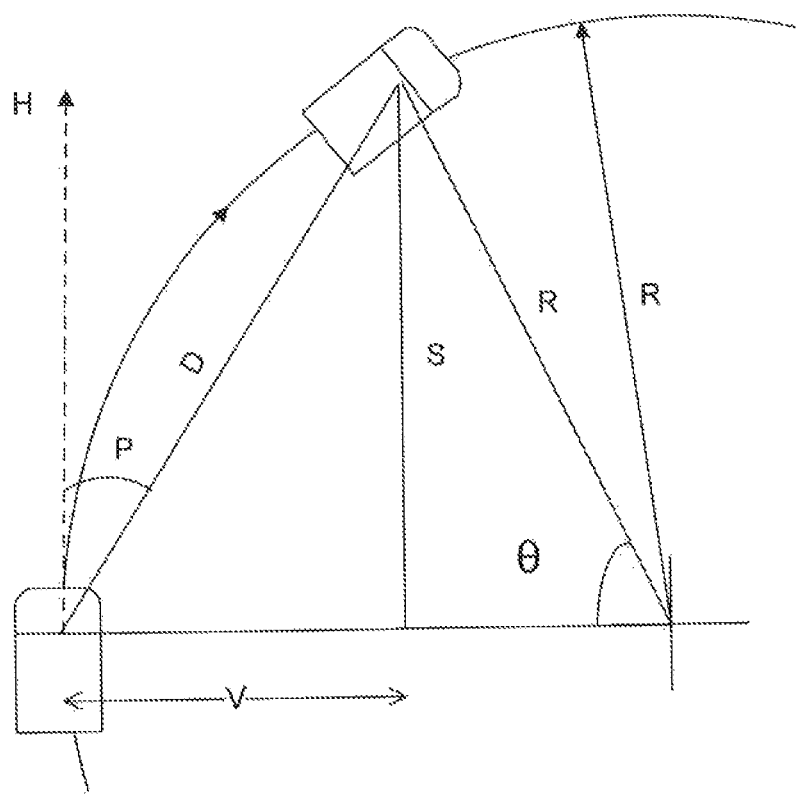
FIG. 2B is a diagrammatic illustration of a calculation for a prediction angle.
Figure 2D:
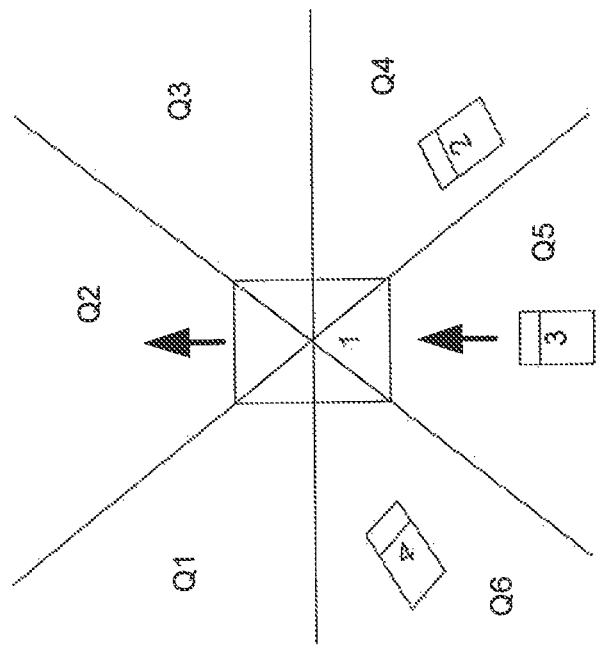
FIG. 2D is a diagrammatic illustration of predefined zones behind a machine.
Figure 2C:
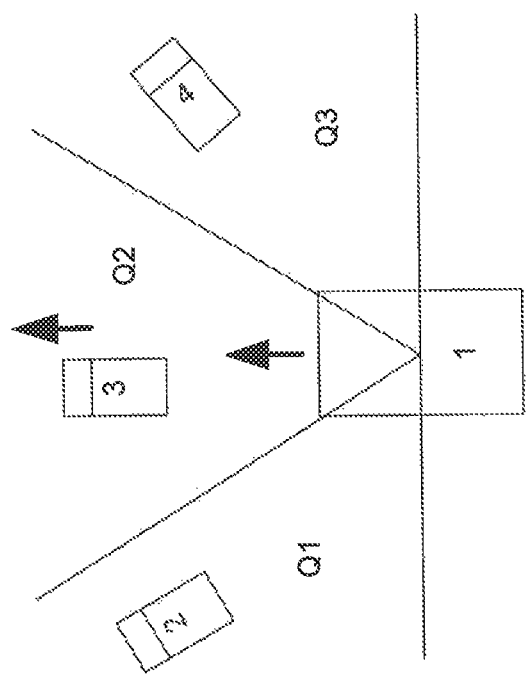
FIG. 2C is a diagrammatic illustration of predefined zones in front of a machine.

Next, a radius of travel (R) illustrated in FIG. 2B may be calculated by controller 250. The radius of travel is the radius of the arc lead machine 100 is traveling on. This radius is a function of the yaw rate and the velocity of lead machine 100. The velocity of lead machine 100 may be calculated using readings from odometer 210 or by using GPS signals from locating device 230 or by another means. The radius of travel may be greater than +/−50 meters in some exemplary embodiments or may be limited to some other minimum or maximum value (for example, minimum +/−50 meters) based on the site controller's preference. The radius of travel may be calculated using the following equation:

$$\text{Radius of Travel [m]} = 360 \text{ [deg]} \times (1/\text{Yaw Rate})[\text{sec/deg}] \times \text{velocity [m/s]} \times 1/(2\pi) \quad (3)$$

Next, a predicted distance traveled for lead machine 100 may be calculated by controller 250 by multiplying the velocity with a predefined projection time. The predefined projection time represents how far in the future you want to know the lead machine 100's position. For example, the predefined projection time may be 1 second, 2 seconds, 10 seconds, etc. The predicted distance traveled is a prediction of how far lead machine 100 will travel from its current position in the predefined projection time at its current velocity. The predicted distance traveled can also be thought of as the straight line distance between the projected position and the current position for lead machine 100. The predicted distance traveled is illustrated in FIG. 2B as "D."

Next, a chord angle ($\theta$) illustrated in FIG. 2B may be calculated using the following equation $$\theta[\text{rad}] = \text{Predicted Distance Traveled [m]}/\text{Radius of Travel}(R)[\text{m}] \quad (4)$$

The projected position of lead machine 100 relative to its current position may now be calculated using the following equations:

$$V\text{ [m]} = R\text{ [m]} \times (1 - \cos(\theta)) \quad (5)$$

$$S\text{ [m]} = R\text{ [m]} \times \sin(\theta) \quad (6)$$

It will be noted that θ may be converted to degrees prior to using it in equations 5 and 6 in some exemplary embodiments depending on the type of trigonometric calculator employed by controller 250.

Next, a predicted angle (P) may be calculated by controller 250 that is an angle of the projected position of lead machine 100 relative to a current heading direction of lead machine 100 that is denoted by "H" in FIG. 2B. The predicted angle may be calculated using the following equation:

$$P[\text{deg}] = a\tan(V/S) \cdot \text{sign of Yaw Rate} \quad (7)$$

The sign of Yaw Rate may be positive if lead machine 100 is turning right and negative is it is turning left.

By using the predicted angle, controller 250 may identify the predicted zone for lead machine 100 from among Q1, Q2, and Q3. For example, if P is between +30 degrees and −30 degrees, the predicted zone may be Q2. If P is greater than +30 but less than +90, the predicted zone may be Q3. If P is less than −30 but greater than −90 degrees, the predicted zone may be Q1. It will be noted that if the zones were defined differently, i.e., not spanning 60 degrees each, values of P will correspond differently to the predicted zones. For example, if each of the zones spanned 90 degrees, then −90<P<0 degrees may correspond to one predicted zone and 0>P>90 may correspond to another predicted zone. It will further be noted that the size of the predicted zone may be limited by defining the maximum radius for the circle of which the predicted zone is a segment.

After selecting a predicted zone, controller 250 may determine if another machine 100 (for example, machines 2, 3, or 4) is in the predicted zone. Controller 250 may make this determination by obtaining a location (for example, GPS coordinates) of the different machines and checking if any of the GPS coordinates are within the predicted zone. For example, if the predicted zone or quadrant of interest happens to be Q3, controller 250 may determine that machine 4 is in the predicted zone of lead machine 100.

Next, controller 250 may determine whether lead machine 100 is following a machine in its predicted zone, which in this example happens to be machine 4. To determine whether lead machine 100 is following machine 4, controller 250 may execute a loop and initialize a counter (Follow (4), where 4 refers to the machine id) for machine 4. Exemplarily, Follow (4) may be initialized to 1. After incrementing Follow (4), controller 250 may recalculate the predicted zone because lead machine 100 may have moved to a new position. If machine 4 is present in the predicted zone, Follow (4) may be further incremented. The loop may continue executing until Follow (4) exceeds some preset threshold value. If Follow (4) exceeds the preset threshold value, lead machine 100 may be deemed to be following machine 4 if the distance between machine 4 and lead machine 100 is less than a predefined Following Distance value. If the distance between lead machine 100 and machine 4 exceeds the predefined Following Distance value, lead machine 100 may not be considered to be following machine 4, and the algorithm may start from the beginning. When the algorithm starts from the beginning, each of the counters (for example, Follow (4)) may be deleted or reset. Exemplarily, controller 250 may determine the distance between the primary machine (here, lead machine 100) and the machine that it is following (here, machine 4) by a variety of means. For example, controller 250 may utilize GPS coordinates for both machines to determine the distance. In other embodiments, controller 250 may utilize a radar-based system or laser-based system to determine the distance between lead machine 100 and machine 4. By requiring Follow (4) to exceed a preset threshold value, controller 250 may ensure that lead machine 100 is deemed to be following machine 4 only after machine 4 has remained in lead machine 100's predicted zone for some minimum time. It will be noted that more than one machine may be present in lead machine 100's predicted zone and separate counters may be created for each machine. For example, if machine 3 was also in lead machine 100's predicted zone, a Follow (3) may be created by controller 250 in addition for Follow (4).

Once lead machine 100 is determined to be following machine 4, controller 250 may determine whether an unsafe condition exists between lead machine 100 and machine 4. If the distance between lead machine 100 and machine 4 is less than a predefined unsafe Following Distance, controller 250 may alert the operators and mine site supervisors that an unsafe following situation has been created and may continue to alert until the operator of the primary machine (here, lead machine 100) or the other machines takes corrective action to move the machines to a safe following distance.

While the above operation was described with reference to machines in front of lead machine 100, controller 250 may also determine whether any machines that are behind lead machine 100 are within an unsafe distance from itself. A majority of the process implemented by controller 250 for machines behind it is identical to the process for machines in front of lead machine 100. A difference, however, is the predicted zone. For machines behind lead machine 100, controller 250 may determine its predicted zone to be a zone that is 180 degrees reversed from the predicted zone in front of lead machine 100. For example, if controller 250 determines Q3 (see FIG. 2D) as the predicted zone in front of the machine based on the predicted angle (P) calculation in equation 7, controller 250 may determine Q6 as the predicted zone behind lead machine 100. Based on the exemplary traffic pattern illustrated in FIG. 2D, if controller 250 determines that Q6 is a predicted zone, controller 250 may then determine whether machine 4 is following lead machine 100 and whether a safe distance is present between the two machines.

FIGS. 3A-4B illustrate exemplary processes implemented by the controller 250 that describe in further detail the above traffic analysis operation. A detailed description of FIGS. 3A-4B is provided in the next section.

INDUSTRIAL APPLICABILITY

Figure 3A:
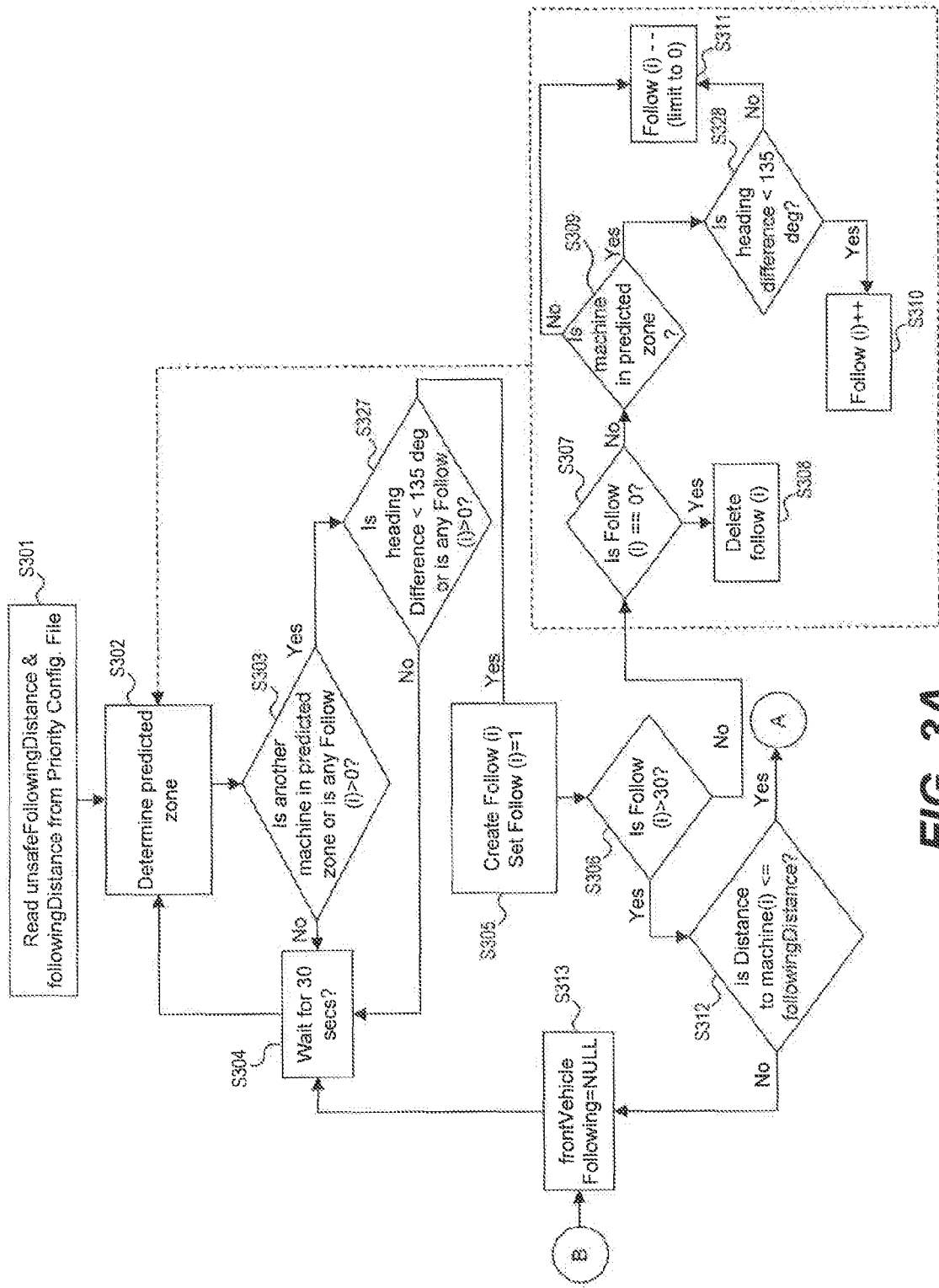
FIGS. 3A and 3B are flowcharts depicting an exemplary disclosed method performed by the traffic analysis system of FIG. 2A when the machine is following another machine.
Figure 3B:
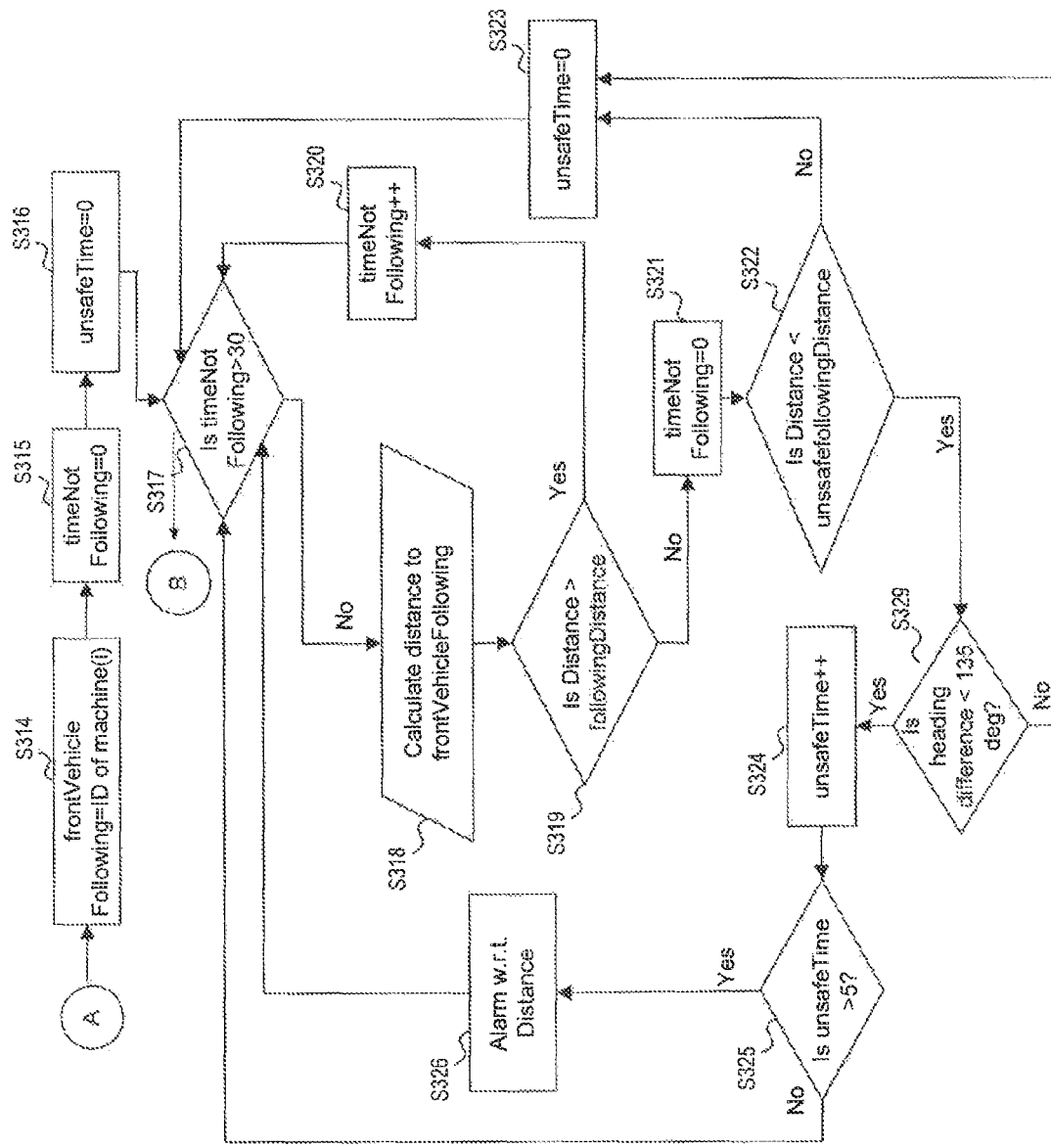
Figure 4A:
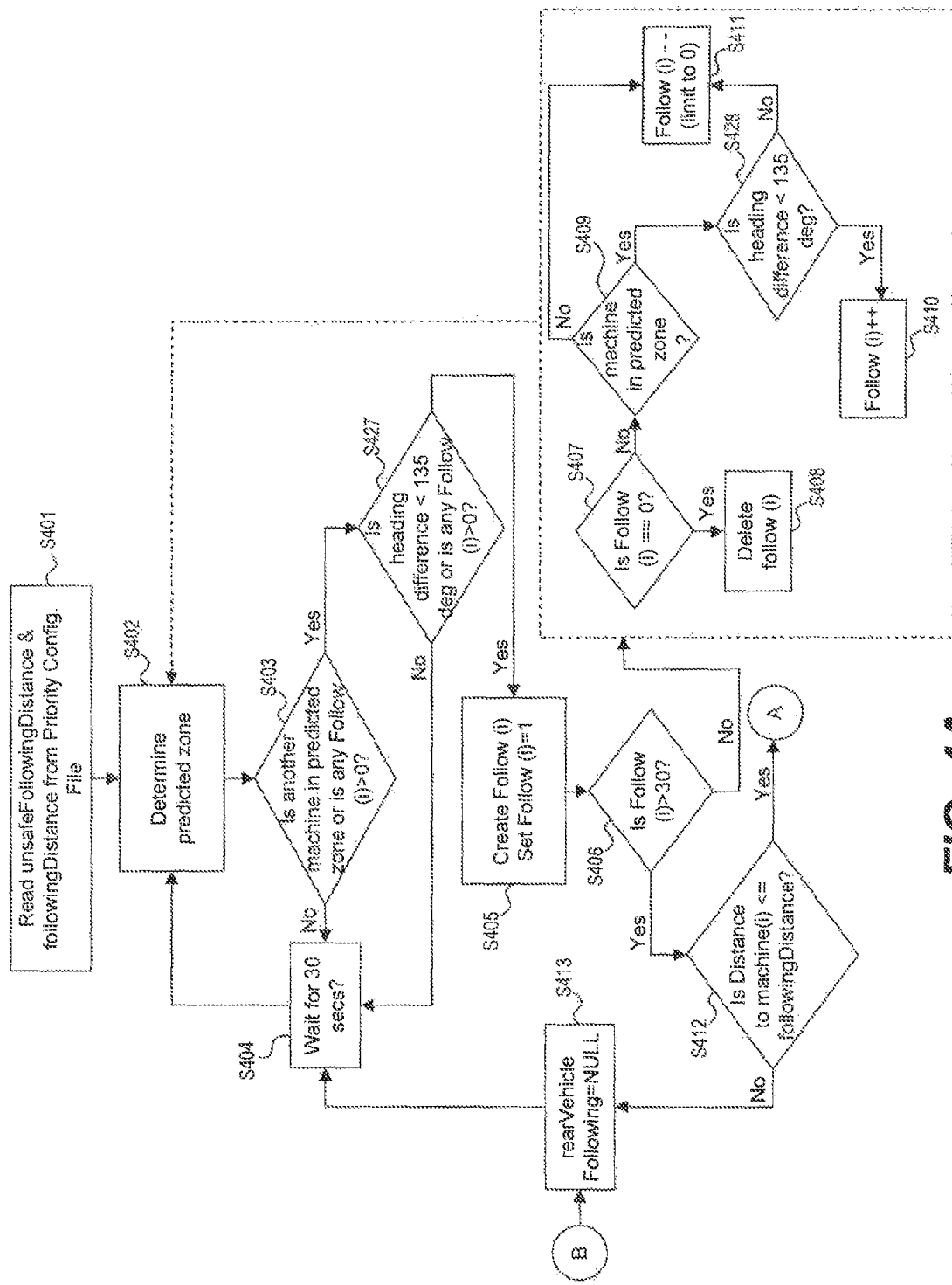
FIGS. 4A and 4B are flowcharts depicting an exemplary disclosed method performed by the traffic analysis system of FIG. 2A when the machine is being followed by another machine.
Figure 4B:
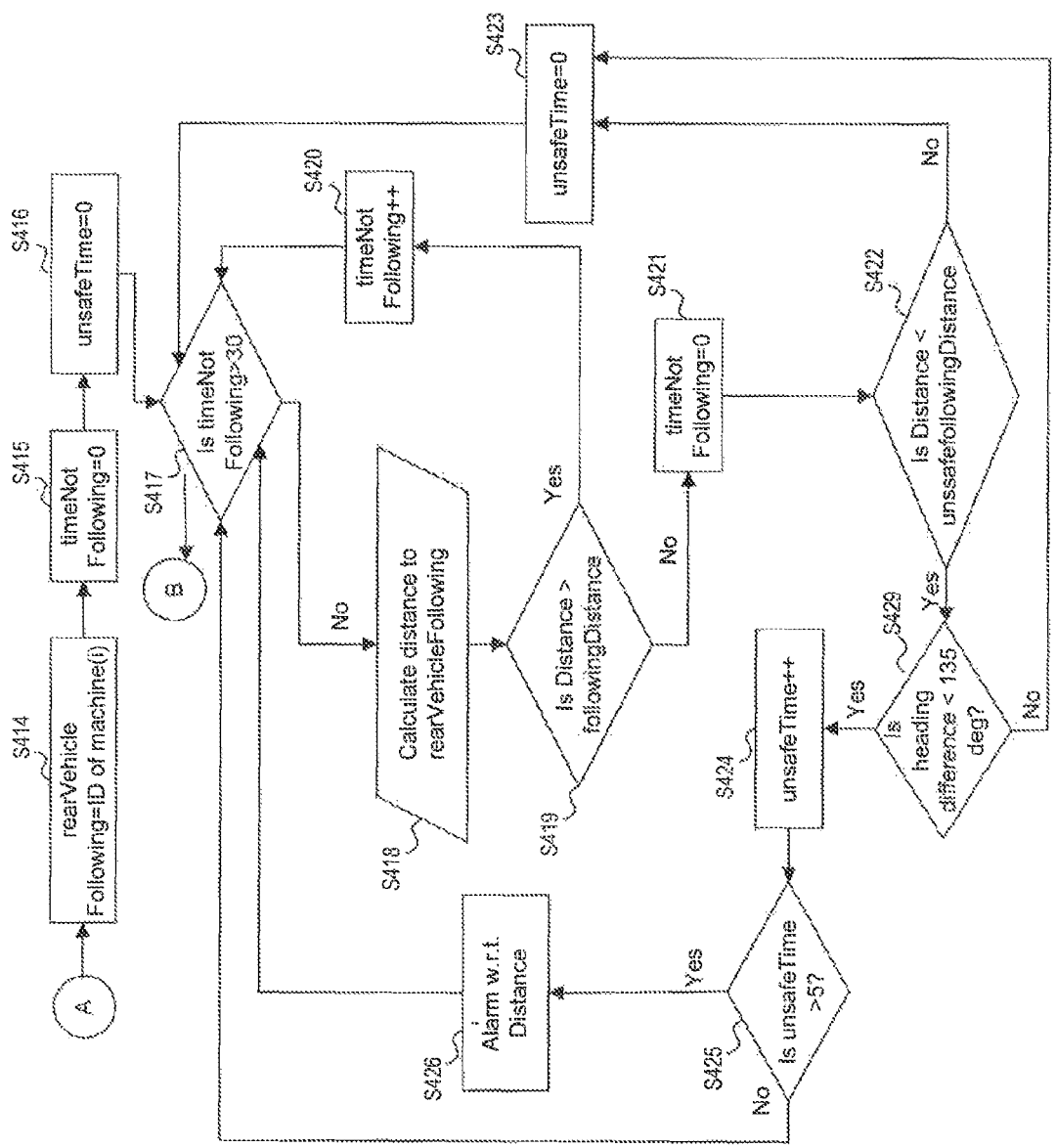

The disclosed traffic analysis system 110 may be applicable to any machine where machine safety on worksites is desired. The disclosed traffic analysis system 110 may provide for improved detection of existence of an unsafe condition between two machines and may alert the operators and mine site supervisors of the unsafe condition. FIGS. 3A-3B illustrate an algorithm that may be executed by controller 250 of lead machine 100 to determine whether an unsafe condition exists between lead machine 100 and another machine in front of lead machine 100. Similarly, FIGS. 4A-4B illustrate an algorithm that may be executed by controller 250 of lead machine 100 to determine whether an unsafe condition exists between lead machine 100 and another machine behind lead machine 100. Operation of the traffic analysis system 110 will now be described in connection with the flowchart of FIGS. 3A-3B.

In step 301, controller 250 may read certain parameters from a priority configuration file that may be stored in storage 252 or memory 253 or elsewhere. For example, controller 250 may read parameters such as Following Distance and unsafe Following Distance that may be utilized later in the algorithm. In step 302, controller 250 may determine a predicted zone. As explained earlier, to determine the predicted zone, controller 250 may determine the projected position of lead machine 100 after a predefined time ("t") and by further utilizing equations (1)-(7), controller 250 may determine a predicted angle ("P") which is an angle of the projected position of lead machine 100 relative to a current heading direction (denoted by "H" in FIG. 2B) of lead machine 100.

By using the predicted angle P, controller 250 may identify the predicted zone for lead machine 100 from among predefined zones in front of lead machine 100. Exemplarily, as shown in FIG. 2C, the predefined zones may be Q1, Q2, and Q3 each of which span 60 degrees. If P is between +30 degrees and −30 degrees, the predicted zone may be determined to be Q2. If P is greater than +30 but less than +90, the predicted zone may be determined to be Q3. If P is less than −30 but greater than −90 degrees, the predicted zone may be determined to be Q1. It will be noted that if the zones were defined differently, i.e., not spanning 60 degrees each, values of P will correspond differently to the predicted zones. For example, if each of the zones spanned 90 degrees, then −90<P<0 degrees may correspond to one predicted zone and 0>P>90 may correspond to another predicted zone. It will further be noted that the size of the predicted zone may be limited by defining the maximum radius for the circle of which the predicted zone is a segment.

After selecting a predicted zone, controller 250 may determine in S303 if another machine 100 (for example, machines 2, 3, or 4) is in the predicted zone or if Follow (i) (which is a parameter described later) for any machine is greater than 0. Controller 250 may make this determination by obtaining a location (for example, GPS coordinates) of the different machines and checking if any of the GPS coordinates are within the predicted zone. For example, if the predicted zone or quadrant of interest happens to be Q3, controller 250 may determine that machine 4 is in the predicted zone of lead machine 100. However, if no machine other than lead machine 100 is present in the selected predicted zone and no Follow (i) exists that is greater than 0, controller 250 may proceed to S304 and wait for a predefined time (for example, 30 seconds) before returning to S302 to determine a new predicted zone.

If controller 250 determines in S303 that another machine (for example, machine 4) is in its predicted zone or determines that a Follow (i) exists for some machine that is not greater than zero, controller 250 may next determine whether lead machine 100 is following machine 4. However, prior to determining whether lead machine 100 is following machine 4, controller 250 may determine in S327 whether a heading difference between lead machine 100 and machine 4 is less than 135 degrees or if Follow (i) for any machine is greater than 0. If the heading difference is determined to be more than 135 degrees, controller 250 may determine that lead machine 100 is not following machine 4 because the lead machine 100 and machine 4 will likely cross each other as they are traveling in almost opposite directions. In such a case, controller 250 may proceed to S304 and wait for a predefined time before determining an updated predicted zone, when no Follow (i) is greater than 0 for any machine. If in S327 controller 250 determines that the heading difference between lead machine 100 and machine 4 is less than 135 degrees or determines that a Follow(i) exists for some machine that is greater than 0, controller 250 may proceed to S305 and initialize a counter Follow (i) for machine (i). As machine 4 is in the predicted zone, controller 250 may create and initialize Follow (4), where 4 refers to the machine id for machine 4. Exemplarily, Follow (4) may be initialized to 1.

Next, in S306, controller 250 may determine whether Follow (i) (here, Follow (4)) is greater than some preset threshold value. Exemplarily, the preset threshold value may be set to but the mine site operator may set any suitable number. If Follow (4) is not greater than 30, controller 250 may determine that machine 4 has not been in lead machine 100's predicted zone for long enough and so cannot yet be deemed as being followed by machine 4. If Follow (4) is not greater than 30 in S306, controller 250 may enter into a sub routine denoted by dotted lines in FIG. 3A. The sub routine (S307-S311) may execute for each machine for which a Follow (i) exists. So, for example, if at time t1 machine 3 entered lead machine 100's predicted zone, a Follow (3) may have been created by controller 250. If at a later time t2 or at the same time t1, if machine 4 entered lead machine 100's predicted zone, a Follow (4) may be created. When controller 250 enters the subroutine, it may execute the subroutine for each of the Follow (i)s.

Inside the subroutine, controller 250 may check whether Follow (i) (for example, Follow (4) and Follow (3) if both have been previously created) is equal to 0 in S307. Taking the example of Follow (4), if Follow (4) is equal to 0, this would mean that machine 4 is no longer in lead machine 100's predicted zone and controller 250 may proceed to S308 to delete Follow (4). However, if in S307, controller 250 determines that Follow (4) is not equal to 0, controller 250 may proceed to S309 to determine whether machine 4 is in lead machine 100's predicted zone as determined in S302. If in S309, controller 250 determines that machine 4 is in the predicted zone, controller 250 may check in S328 whether the heading difference between machine 4 and lead machine 100 is less than 135 degrees. If the heading difference is less than 135 degrees, Follow (4) may be incremented in S310 else Follow (4) may be decremented in S311. If in S309, controller 250 determines that machine 4 is not in the predicted zone, Follow (4) may be decremented in S311. After the subroutine has been executed for existing Follow (i)'s, control may return to S302 where controller 250 may recalculate the predicted zone because lead machine 100 may have moved to a new position.

If in S306, controller 250 determines that for one of the machines, Follow (i) (for example, Follow (4)) exceeds the preset threshold value (for example, 30), controller 250 may proceed to S312. In S312, controller 250 may obtain the Following Distance parameter from the configuration file and determine whether a distance between lead machine 100 and machine 4 is less than the predefined Following Distance. The value Following Distance may be set to be greater than unsafe Following Distance and may act as a preliminary check for a safe distance between the two machines. For example, Following Distance may be set to a value such as 100 m and unsafe Following Distance may be set to 20 m. It will be noted that any suitable value may be set for these parameters. If in S312, controller 250 determines that the distance between machine 4 and lead machine 100 is greater than Following Distance, controller 250 may proceed to S313 and set a value front Vehicle Following to Null which indicates that lead machine 100 is not following another machine. It will be noted that if in S306, Follow (i) is greater than 30 for more than one machine, the distance to the closest machine may be selected as the distance for purposes of S312. If in S312, controller 250 determines that the distance between machine 4 (assuming machine 4 is the closest machine) and lead machine 100 is less than Following Distance, controller 250 may determine that lead machine 100 is following machine 4. Accordingly, in S314, controller 250 may set a parameter front Vehicle Following equal to the id of machine 4. In S315 and S316, controller 250 may initialize variable time Not Following and unsafe Time equal to 0.

In S317, controller 250 may check whether time Not Following is greater than some preset threshold value (for example, 30). This check is to make sure that if lead machine 100, which was deemed to be following machine 4, is maintaining a distance from machine that is greater than Following Distance for a given amount of time, then lead machine 100 should not be deemed as following machine 4. Accordingly, if in S317, controller 250 determines that time Not Following is greater than 30, control may proceed to S313. Otherwise, control may proceed to S318 where controller 250 may calculate the distance between lead machine 100 and machine 4. In S319, controller 250 may check whether the distance is greater than Following Distance and if yes, the parameter time NOT Following may be incremented in S320. Otherwise, time Not Following may be set to 0 in S321 and controller 250 may proceed to S322. In S322, controller 250 may check whether the distance between lead machine 100 and machine 4 is less than unsafe Following Distance and if yes, control may proceed to S329 where controller 250 may check whether the heading difference between lead machine 100 and machine 4 is less than 135 degrees. If the heading difference is less than 135 degrees, the counter unsafe Time may be incremented else unsafe Time may be set to 0 in S323. If in S322, controller 250 determines that the distance between lead machine 100 and machine 4 is greater than unsafe Following Distance, unsafe Time may be set to 0 in S323.

After incrementing unsafe Time in S324, controller 250 may check whether unsafe Time is less than a preset threshold (for example, 5). If unsafe Time is less than the preset threshold, control may proceed back to S317 else controller 250 may determine that an unsafe distance has been maintained between lead machine 100 and machine 4 for some time and alerts the operators of lead machine 100 and machine 4. It will be noted that the various values (for example, 135 degrees heading difference, unsafe Time of 5, etc.) that have been indicated in the above algorithm are only examples and that any appropriate value may be set by the operator for these different parameters. The process may continue to repeat in this manner until receiving instructions to stop or until new data ceases to be collected from the machine 100.

While the above algorithm was described with reference to machines in front of lead machine 100, controller 250 may also determine whether any machines that are following lead machine 100 are within an unsafe distance from itself. Exemplarily, to determine whether any machines that are following lead machine 100 are within an unsafe distance from itself, controller 250 may execute the algorithm described with reference to FIGS. 4A-4B. A majority of the algorithm of FIGS. 4A-4B is identical to the algorithm described with reference to FIGS. 3A-3B. For example, S301 in FIG. 3A is identical to S401 in FIG. 4A. Accordingly, only the differences between the two algorithms are described. A difference between the two algorithms is the predicted zone determined in S302 and S402. For machines behind lead machine 100, controller 250 may determine its predicted zone to be a quadrant that is 180 degrees reversed from the predicted zone in front of lead machine 100. For example, if controller 250 determines Q3 (see FIG. 2D) as the predicted zone in front of the machine based on the predicted angle (P) calculation in equation 7, controller 250 may determine Q6 as the predicted zone behind lead machine 100 in S402. Based on the exemplary traffic pattern illustrated in FIG. 2D, if controller 250 determines that Q6 is the predicted zone, controller 250 may then determine whether machine 4 is following lead machine 100 and whether a safe distance is present between the two machines. Another difference is that in S414, the id of the machine that is following lead machine 100 may be set for the parameter rear Vehicle Following and in S413, rear Vehicle Following may be set to Null.

The disclosed exemplary embodiments may allow for improved detection of existence of an unsafe condition between two machines and may alert the operators and mine site supervisors of the unsafe condition. For example, by creating multiple counters and checking whether the counters exceed preset threshold value, the system raises alarms about unsafe conditions only after existence of the unsafe condition has been observed over some period of time. This decreases the number of false alarms that may be initiated by prior art systems.

It will be apparent to those skilled in the art that various modifications and variations can be made to the disclosed traffic analysis system. Other embodiments will be apparent to those skilled in the art from consideration of the specification and practice of the disclosed traffic analysis system. It is intended that the specification and examples be considered as exemplary only, with a true scope being indicated by the following claims and their equivalents.

What is claimed is:

1. A computer-implemented method of analyzing traffic in a vicinity of a first machine, comprising:
    determining a predicted distance traveled for the first machine based on velocity of the first machine and a predefined time;
    determining, by one or more computer processors, a projected position of the first machine based on the predicted distance traveled and a yaw rate of the first machine;
    determining, by the one or more computer processors, an angle of the projected position relative to a current heading of the first machine;
    selecting, by the one or more computer processors, a predicted zone from among a plurality of predefined zones in the vicinity of the first machine based on the determined angle;
    determining whether a second machine is present in the predicted zone; and
    in response to determining that the second machine is present in the predicted zone, determining whether an unsafe condition exists between the first machine and the second machine.

2. The computer-implemented method of claim 1, wherein determining the projected position includes:
    determining a radius of travel for the first machine based on the yaw rate and the velocity; and
    determining the projected position using the radius of travel and the predicted distance traveled.

3. The computer-implemented method of claim 1, wherein determining whether an unsafe condition exists includes:
    determining whether the second machine is following or is being followed by the machine; and
    in response to determining that the second machine is following or is being followed by the first machine, determining a distance between the first machine and the second machine.

4. The computer-implemented method of claim 3, wherein determining whether the second machine is following or is being followed by the first machine includes:
    initializing a first counter for the second machine;
    updating the projected position of the first machine;
    updating the predicted zone based on the updated projected position; and
    incrementing the first counter when the second machine is present in the updated predicted zone.

5. The computer-implemented method of claim 4, wherein the second machine is determined to be following or being followed by the first machine when the first counter exceeds a first predefined threshold value.

6. The computer-implemented method of claim 3, wherein determining whether an unsafe condition exists further includes:
    executing a loop that checks whether the distance is less than a predefined unsafe following distance and increments a second counter when the distance is less than the predefined unsafe following distance; and
    determining that an unsafe condition exists when the second counter exceeds a second predefined threshold value.

7. A system for analyzing traffic in a vicinity of a first machine, comprising:
    a locating device configured to receive a signal indicative of a location of the first machine; and
    a controller in communication with the locating device, the controller configured to:
    determine a velocity of the first machine using the received signal;
    determine a predicted distance traveled for the first machine based on the velocity and a predefined time;
    determine a projected position of the first machine based on the predicted distance traveled and a yaw rate of the first machine;
    determine an angle of the projected position relative to a current heading of the first machine;
    selecting a predicted zone from among a plurality of predefined zones in the vicinity of the first machine based on the determined angle;
    determine whether a second machine is present in the predicted zone; and in response to determining that the second machine is present in the predicted zone, determine whether an unsafe condition exists between the first machine and the second machine.

8. The system of claim 7, wherein the controller is configured to determine the projected position by:
   determining a radius of travel for the first machine based on the yaw rate and the velocity; and
   determining the projected position using the radius of travel and the predicted distance traveled.

9. The system of claim 7, wherein the controller is configured to determine whether an unsafe condition exists by:
   determining whether the second machine is following or is being followed by the first machine; and
   in response to determining that the second machine is following or is being followed by the first machine, determining a distance between the first machine and the second machine.

10. The system of claim 9, wherein the controller is configured to determine whether the second machine is following or is being followed by the machine by:
    initializing a first counter for the second machine;
    updating the projected position of the first machine;
    updating the predicted zone based on the updated projected position; and
    incrementing the first counter when the second machine is present in the updated predicted zone.

11. The system of claim 10, wherein the second machine is determined to be following or being followed by the first machine when the first counter exceeds a first predefined threshold value.

12. The system of claim 9, wherein to determine whether an unsafe condition exists the controller is further configured to:
    execute a loop that checks whether the distance is less than a predefined unsafe following distance and increments a second counter when the distance is less than the predefined unsafe following distance; and
    determine that an unsafe condition exists when the second counter exceeds a second predefined threshold value.

13. A non-transitory computer-readable storage medium storing instructions for enabling a processor to execute a method of analyzing traffic in a vicinity of a first machine, the method comprising:
    determining a predicted distance traveled for the first machine based on a velocity of the first machine and a predefined time;
    determining a projected position of the first machine based on the predicted distance traveled and a yaw rate of the first machine;
    determining an angle of the projected position relative to a current heading of the first machine;
    selecting a predicted zone from among a plurality of predefined zones in the vicinity of the machine based on the determined angle;
    determining whether a second machine is present in the predicted zone; and
    in response to determining that the second machine is present in the predicted zone, determining whether an unsafe condition exists between the first machine and the second machine.

14. The non-transitory computer-readable storage medium of claim 13, wherein determining the projected position includes:
    determining a radius of travel for the first machine based on the yaw rate and the velocity; and
    determining the projected position using the radius of travel and the predicted distance traveled.

15. The non-transitory computer-readable storage medium of claim 13, wherein determining whether an unsafe condition exists includes:
    determining whether the second machine is following or is being followed by the machine; and
    in response to determining that the second machine is following or is being followed by the first machine, determining a distance between the first machine and the second machine.

16. The non-transitory computer-readable storage medium of claim 15, wherein determining whether the second machine is following or is being followed by the first machine includes:
    initializing a first counter for the second machine;
    updating the projected position of the first machine;
    updating the predicted zone based on the updated projected position; and
    incrementing the first counter when the second machine is present in the updated predicted zone.

17. The non-transitory computer-readable storage medium of claim 16, wherein the second machine is determined to be following or being followed by the first machine when the first counter exceeds a first predefined threshold value.

* * * * *